3,523,349
CUTTING TOOL ASSEMBLY
Bernard M. Pollington, 22600 Middlebelt, Farmington, Mich. 48024, and Leslie W. Pollington, 19410 Rennesellor, Livonia, Mich. 48152
Filed Mar. 4, 1968, Ser. No. 710,259
Int. Cl. B26d 1/00
U.S. Cl. 29—97.5     10 Claims

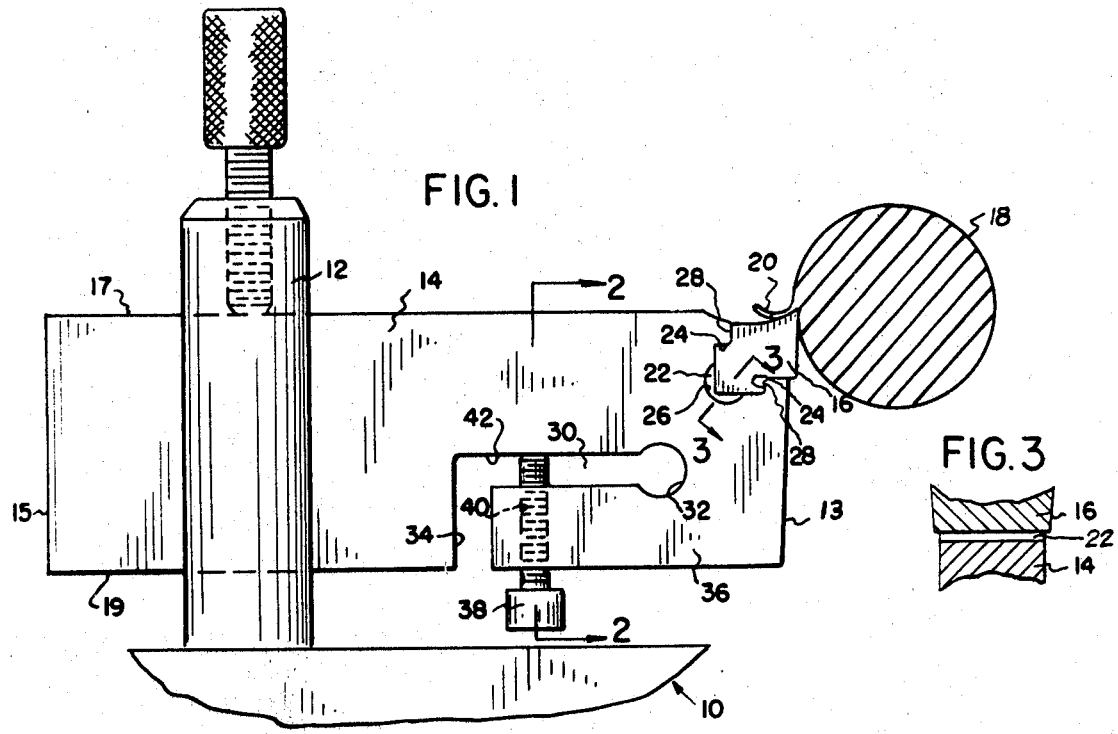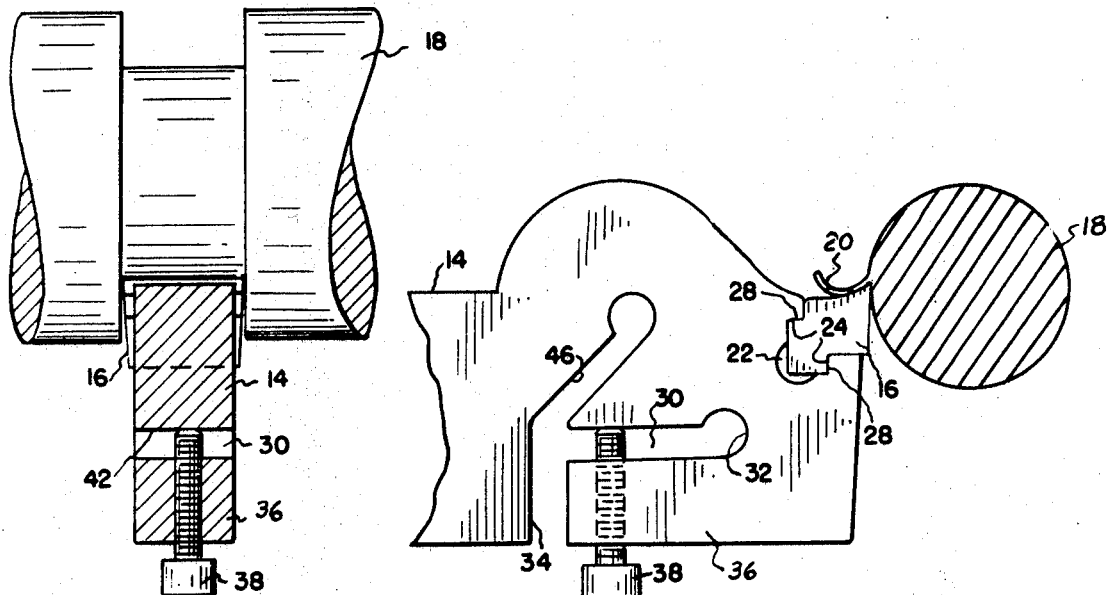

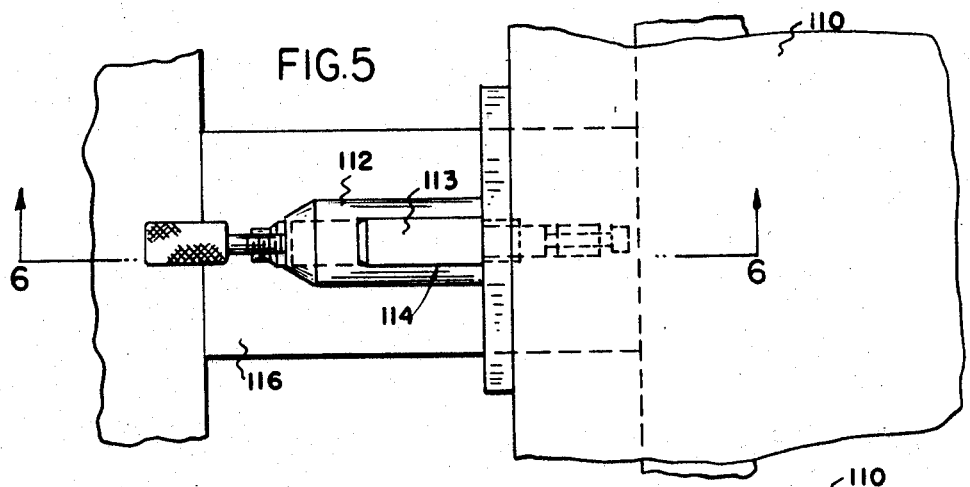
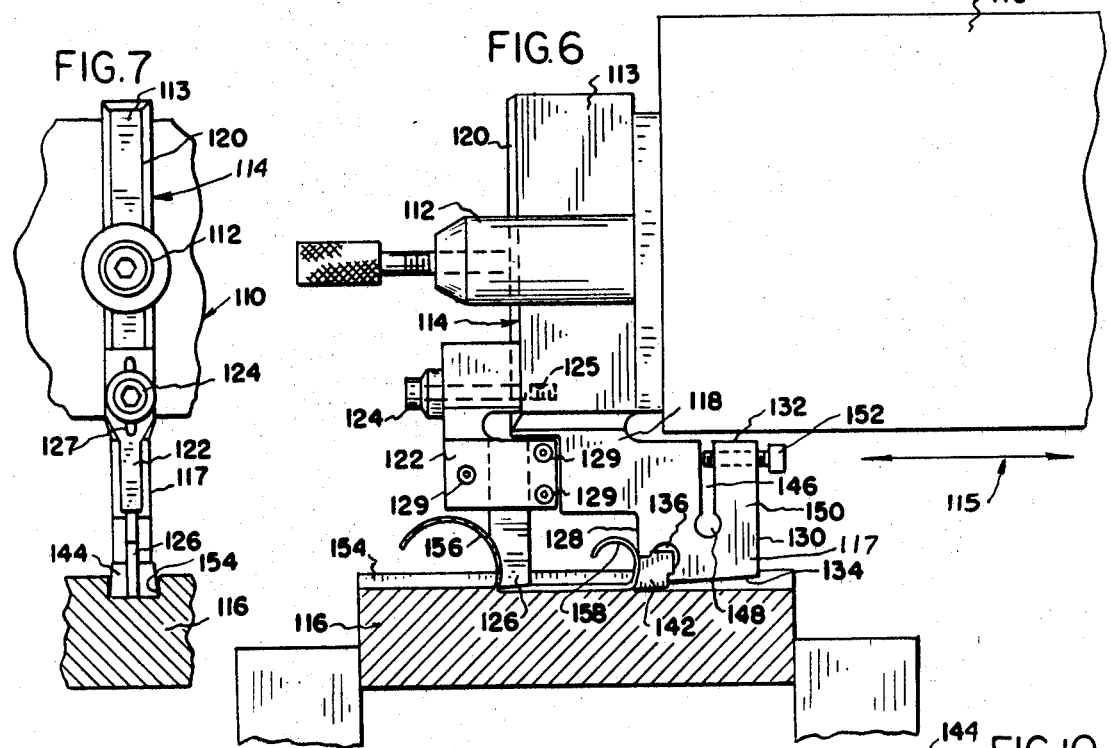
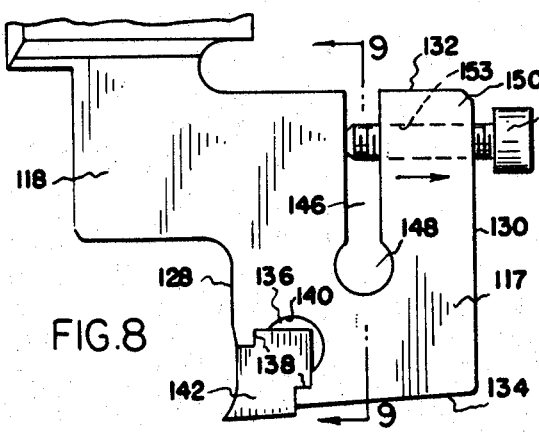
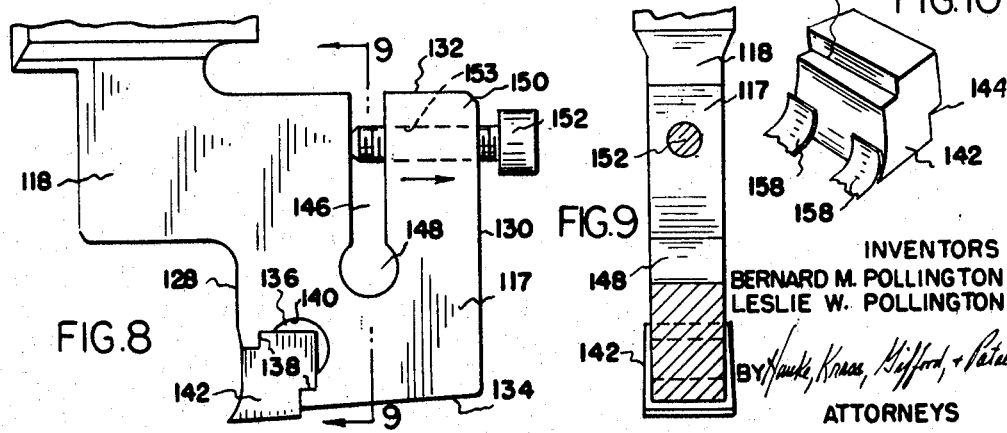
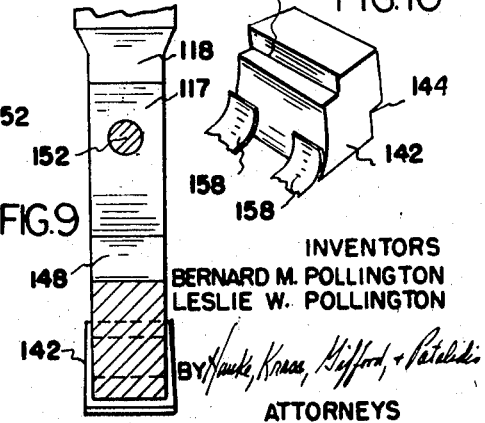

ABSTRACT OF THE DISCLOSURE

A cutting tool assembly for shapers, planers, lathes and the like including a holder having a pair of gripping jaws formed at the intersection of two sides of the holder. The holder is provided with a slot disposed with respect to the gripping jaws such that widening the slot causes the gripping jaws to be moved one toward the other to securely clamp a cutting tool therebetween. A screw provides the means for widening the slot and the holder is formed from material which will return to its original position upon loosening the screw so that the cutting tool can be removed. In one embodiment the holder carries a forward cutting tool and a rear cutting tool with the forward cutting tool designed to remove a chip of a smaller width than the aligned rear cutting tool.

BACKGROUND OF THE INVENTION

Field of the invention

The present invention relates to cutting tool assemblies and more particularly to such an assembly including a holder and a cutting tool and means provided on the holder for securely attaching and readily releasing the cutting tool.

Description of the prior art

Cutting tool assemblies have been heretofore provided which have included a holder provided with a recess for carrying a cutting tool and a slot intersecting the recess so that drawing the slot together as by a screw or the like produces a clamping action to retain the cutting tool in the recess. While such means are generally satisfactory they require that aligned threaded bores be provided intersecting the slot and that the screw be engaged and disengaged from the inner threaded bore to clamp and unclamp the cutting tool. Alignment of these bores is sometimes difficult especially if the holder has become slightly deformed or if the threads in the inner bore have become worn or stripped. If it is necessary to rethread the inner bore this can be difficult.

Also, tightening the screw and thereby drawing the faces defining the slot one toward the other inherently causes misalignment of the bores so that wear and even stripping of the threads formed in the holder or on the screw is common.

SUMMARY OF THE PRESENT INVENTION

The present invention provides an assembly in which the cutting tool is held at the intersection of two sides of the holder. A portion of the corner is removed to form a pair of gripping jaws. A slot is formed in the holder open to one side thereof and extending substantially parallel to one of the intersecting sides of the holder. The slot is spaced from the recess for the cutting tool and upon widening of the slot the gripping jaws are drawn together to securely clamp the cutting tool therebetween. A screw has an end which engages one face forming the slot so that tightening the screw spreads the slot and the holder is sufficiently resilient that loosening the screw permits removal of the cutting tool.

In one embodiment of the assembly a second cutting tool is provided forwardly of the holder and is aligned with the first mentioned cutting tool. The cutting tools are spaced on opposite sides of the holder and the forwardly disposed cutting tool is smaller in width than the rearward cutting tool. Such a tool is intended primarily for use in a planer or shaper and therefore removes material from the workpiece in three distinct chips rather than the usual single chip. This has been found to produce a cleaner cut with much less chip interference. Further, spacing of the cutting tools has been found to substantially reduce tool chatter.

DESCRIPTION OF THE DRAWINGS

Other advantages of the present invention will be readily apparent from the following description of the invention. The description makes reference to the accompanying drawings in which like reference characters refer to like parts throughout the several views and in which:

FIG. 1 is a fragmentary elevational view illustrating one preferred embodiment of the present invention;

FIG. 2 is a cross sectional view as seen substantially from line 2—2 of FIG. 1;

FIG. 3 is a fragmentary cross sectional view taken along substantially line 3—3 of FIG. 1;

FIG. 4 is a fragmentary elevational view similar to FIG. 1 but illustrating a preferred modification of the holder assembly shown in FIG. 1;

FIG. 5 is a fragmentary plan view illustrating another preferred embodiment of the present invention;

FIG. 6 is an elevational view as seen substantially from line 6—6 of FIG. 5;

FIG. 7 is an elevational view substantially as seen from the left hand side of FIG. 6;

FIG. 8 is an enlarged fragmentary view of a portion of the structure shown in FIG. 6;

FIG. 9 is a cross sectional view taken substantially on line 9—9 of FIG. 8; and

FIG. 10 is a perspective view of the preferred cutting tool of the present invention.

DESCRIPTION OF SEVERAL PREFERRED EMBODIMENTS

Now referring to the drawings for a detailed description of the present invention one preferred assembly is illustrated in FIGS. 1, 2 and 3 as being used with a lathe generally indicated at 10 and provided with a tool mount 12. The tool mount 12 adjustably positions a holder 14 to engage a cutting tool 16 with a rotating workpiece 18 so that a chip 20 is removed from the circumference of the workpiece 18 in the usual manner.

As can best be seen in FIGS. 1 and 3 the holder 14 is substantially rectangular having parallel sides 13, 15 and 17, 19, and is provided with a recess 22 at the intersection of sides 13 and 17. The recess 22 preferably is provided with a pair of transversely extending, opposed shoulders 24 and a substantially circular end section 26. The shoulders 24 are adapted to seat in corresponding recesses 28 formed in the cutting tool 16 to securely clamp the cutting tool 16 in the recess 22 in a manner which will become more apparent as the description proceeds. An elongated slot 30 is formed in the holder 14 and extends substantially parallel to the sides 17 and 19 of the holder 14 and terminates in a circular end portion 32 spaced from the recess 22. The opposite end of the slot 30 registers wtih a substantially normally extending slot 34 which in turn extends to side 19 of the holder 14. The slots 30 and 34 form an arm section 36 of the holder 14 and a screw member 38 extends through a threaded portion 40 of the arm section 36 adjacent the free end thereof so that its end engages an inner face 42 defining the slot 30.

As is clearly shown in FIG. 1 the slot 30 is at all points spaced from the recess 22 and the end section 32 of the slot 30 is disposed such that a plane substantially bisecting the recess 22 will intersect the end portion 32. This positions the slot 30 so that tightening the screw 38 to flex the arm section 36 away from the face 42 produces a movement of the shoulders 24 toward one another to securely clamp the cutting tool 16 in place.

FIG. 4 discloses a tool holder assembly substantially similar to the one shown in FIGS. 1–3 except a slot 46 is provided intersecting the intersection of slots 30 and 34 and extending substantially parallel to a plane extending from the end section 32 of the slot 30 to the recess 22. The slot 46 is not intended to perform a clamping function but provides a certain amount of resilience to the holder to enable the cutting tool 16 to flex during use and thereby reduce breakage.

It is apparent that forming the tool holder 14 of a resilient material such as tempered steel or the like provides a secure clamping action in the form of the gripping jaws or shoulders 24 which securely engage the cutting tool 16 upon tightening the screw 38. Loosening the screw 38 permits the arm section 36 to return to its original position to relieve the force tending to urge the shoulders 24 one toward the other so that the cutting tool 16 can be removed from the recess 22.

Unlike previous constructions it is not necessary to align the screw 38 with a threaded bore provided in the face 42 because the end of the screw 38 engages and slides along the face 42 upon tightening of the screw 38. There is no problem of misalignment upon widening the slot or the problem of wear or stripping caused by such misalignment.

FIGS. 5–10 illustrate another preferred embodiment of the present invention intended for use in a shaping or planing machine or the like.

As can best be seen in FIGS. 5, 6 and 7 a shaping machine 110 is preferably provided with a mounting clamp 112 engaging an upper rectangular portion 113 of a holder 114 to position the holder 114 with respect to a workpiece 116. The planer 110 is adapted to move horizontally back and forth with respect to the workpiece 116 as shown by the arrows 115 in FIG. 6. The workpiece 116 is indexed to the desired positions with respect to the machine 110.

The holder 114 further preferably comprises a lower rectangular holder section 117 disposed below and offset from the rectangular section 113 and connected thereto by an intermediate section 118. A slideway 120 is formed on the leading edge of the rectangular portion 113 to provide means for slidably mounting a cutter assembly 122 to the portion 113. The cutter assembly 122 is clamped to the slideway 120 by means of a screw 124 engaged in a bore 125 provided in the portion 113 and carries at its lower end a forward cutting tool 126. As can best be seen in FIG. 7 the cutter assembly 122 is provided with a vertical slot 127 receiving the screw 124 to permit vertical adjustment of the assembly 122 with respect to the holder 114 and thus adjustment of the forward cutter 126 with respect to the workpiece 116. As can best be seen in FIG. 6 the cutter is mounted to the assembly 122 by a plurality of screws 129.

As can best be seen in FIGS. 6 and 8 the lower holder section 117 is provided with substantially parallel sides 128, 130 and 132, 134. A recess 136 is formed at the intersection of sides 128 and 134 and provides the means for carrying a cutting tool 142. The recess 136 is formed with opposing transversely extending shoulders 138 and a circular end section 140. The shoulders 138 form gripping jaws which engage in grooves 144 formed in the cutting tool 142 to clamp the cutting tool 142 to the holder 114 in a manner similar to that described above.

As can best be seen in FIG. 8 a slot 146 is provided in the lower holder section 117 and extends vertically from the side 132 to terminate in a circular end section 148 spaced from the side 134. As described above the end section 148 is spaced from the recess 136 and a plane bisecting the recess 136 will intersect the end section 148. Also as described above flexing an arm section 150 formed intermediate the slot 146 and the side 130 outwardly causes the shoulders 138 to be moved toward each other to securely lock the cutting tool 142 therebetween. A screw 152 extending through a threaded bore 153 in the arm section 150 and engaging the portion of the holder section 117 defining the inner face of the slot 146 causes a spreading of the slot 146 upon tightening to produce the clamping action. The material of the holder section 117 is sufficiently resilient that upon loosening the screw 152 the arm section 150 will return to its normal position and the cutting tool 142 may be removable from the recess 136.

As indicated above the cutting tool assembly illustrated in FIGS. 6–10 is intended for use in a planer or shaper. In the use illustrated the assembly is intended to be moved relative to the workpiece 116 so that the cutting tools 126 and 142 will form a slot 154 in the workpiece 116 at each indexed position of the workpiece 116. As can best be seen in FIG. 7 the cutting tool 126 is aligned with the center of the cutting tool 142 but is of a substantially smaller width. This provides a construction in which the leading cutter 126 removes a center chip 156 and the cutting tool 142 removes chips 158 which are separated by the slot formed by the removal of the chip 156 as can best be seen in FIG. 10. This produces a cleaner cut with less chip interference than that produced when a single cutter is used.

Further, by positioning the cutting tools 126 and 142 on opposite sides of the holder 114 and substantially in line with the vertical sides of the rectangular portion 113 a two point contact with the workpiece 116 is achieved and this substantially reduces tool chatter.

It is apparent that although several preferred embodiments of the present invention have been described many changes and modifications can be made therein without departing from the spirit of the invention as expressed by the scope of the appended claims.

We claim:
1. A tool assembly comprising:
   a holder provided with a slotted corner portion forming resilient gripping jaws,
   said holder formed with an elongated slot disposed so that widening of the slot urges said gripping jaws one toward the other,
   a cutting tool carried by said gripping jaws, and
   means carried by said holder and selectively operable to widen said slot to thereby retain said cutting tool in said holder.

2. The tool assembly as defined in claim 1 and in which said last mentioned means comprises a screw operable upon tightening to widen said slot.

3. The tool assembly as defined in claim 1 and in which one end of said slot opens to one side of said holder and the opposite end of said slot is disposed within said holder.

4. The tool assembly as defined in claim 3 and in which a plane intermediate said gripping jaws intersects the end of said slot disposed within said holder.

5. The tool assembly as defined in claim 1 and in which said holder is formed with at least three straight sides, said gripping jaws being formed at the junction of two of said sides and said slot being open to the third of said sides.

6. The tool assembly as defined in claim 5 and in which said slot extends parallel to one of said sides.

7. The tool assembly as defined in claim 1 and including a second cutting tool and means adjustably mounting said second cutting tool to said holder.

8. The tool assembly as defined in claim 7 and in which said holder comprises a rectangular portion adapted for mounting said holder to a machine and said cutting tools being mounted to said holder to substantially align with parallel sides of said rectangular portion.

9. The tool assembly as defined in claim 7 and in which said second cutting tool is mounted to engage a workpiece ahead of said first mentioned cutting tool and said second cutting tool being narrower in cutting width than said first mentioned cutting tool.

10. The tool assembly as defined in claim 3 and in which said slot is separated at all points from said gripping jaws by a solid section of said holder.

References Cited
UNITED STATES PATENTS

| | | | |
|---|---|---|---|
| 1,290,542 | 1/1919 | Goss | 29—97.5 |
| 2,399,727 | 5/1946 | Eklund | 29—97.5 X |
| 2,744,451 | 5/1956 | Lee | 29—97 X |
| 2,780,856 | 2/1957 | Traycoff | 29—96 |

HARRISON L. HINSON, Primary Examiner

U.S. Cl. X.R.

29—96, 97